March 22, 1955   A. JAHNCKE   2,704,461
DRIVING DEVICE FOR A GRAMOPHONE TURN-TABLE
Filed Aug. 25, 1950   3 Sheets-Sheet 1
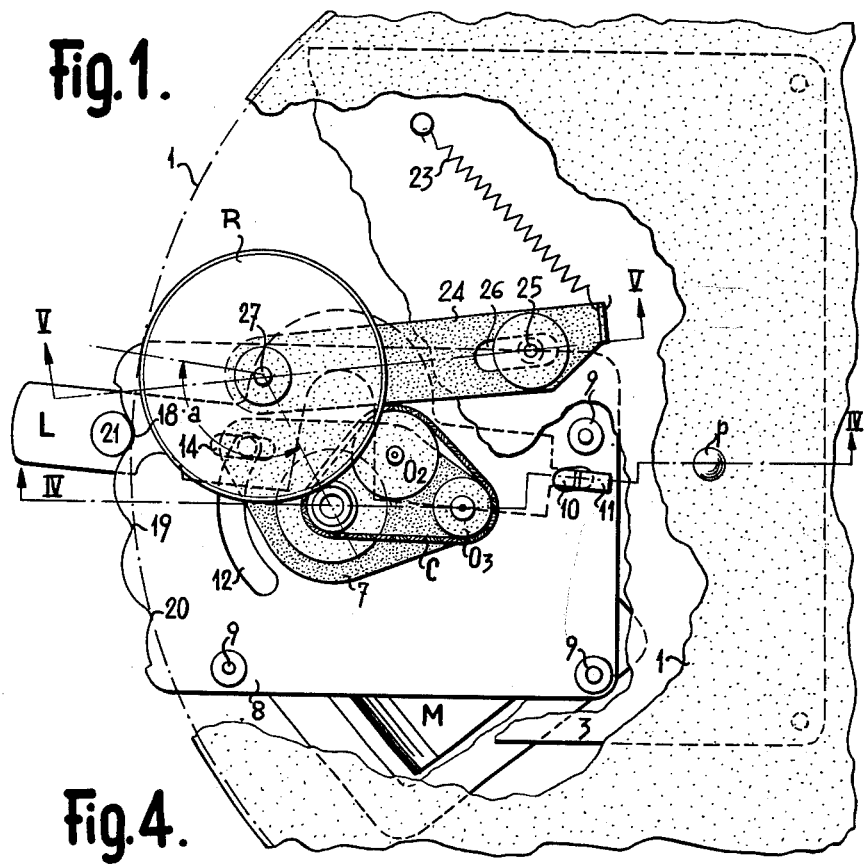
INVENTOR
Albert Jahncke.
BY
ATTORNEY March 22, 1955  A. JAHNCKE  2,704,461
DRIVING DEVICE FOR A GRAMOPHONE TURN-TABLE
Filed Aug. 25, 1950  3 Sheets-Sheet 2
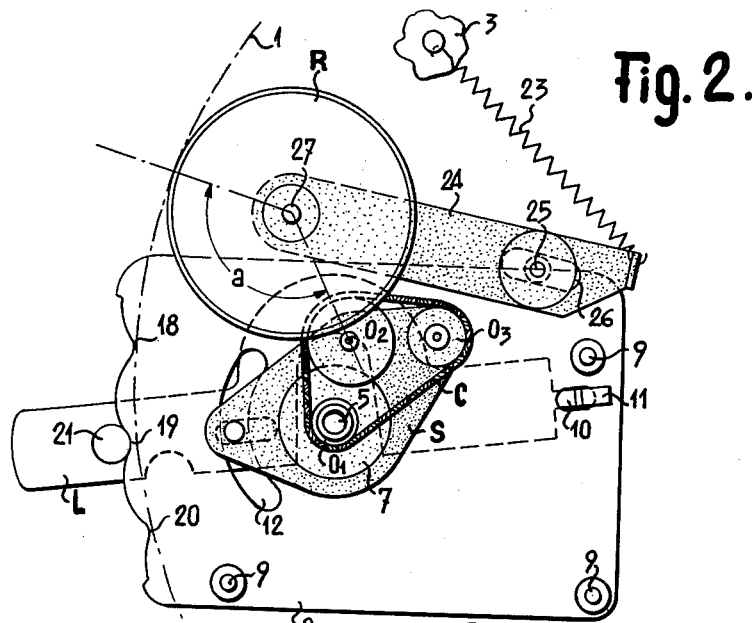
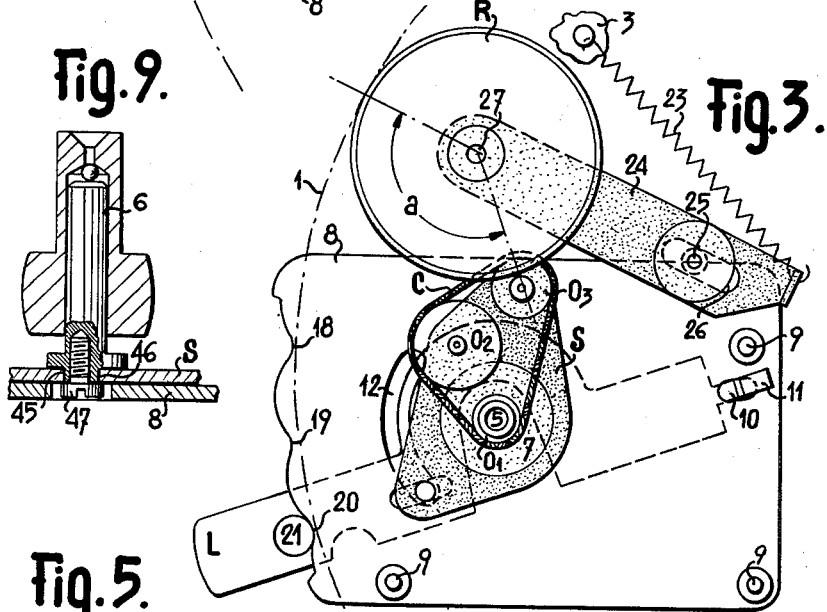
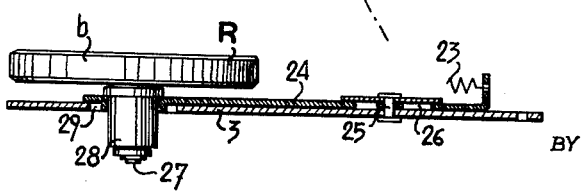
INVENTOR
Albert Jahncke.

March 22, 1955      A. JAHNCKE      2,704,461
DRIVING DEVICE FOR A GRAMOPHONE TURN-TABLE
Filed Aug. 25, 1950      3 Sheets-Sheet 3
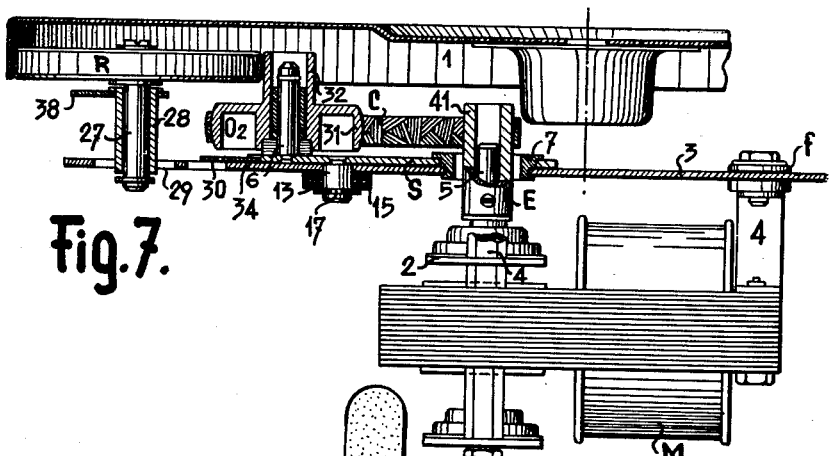
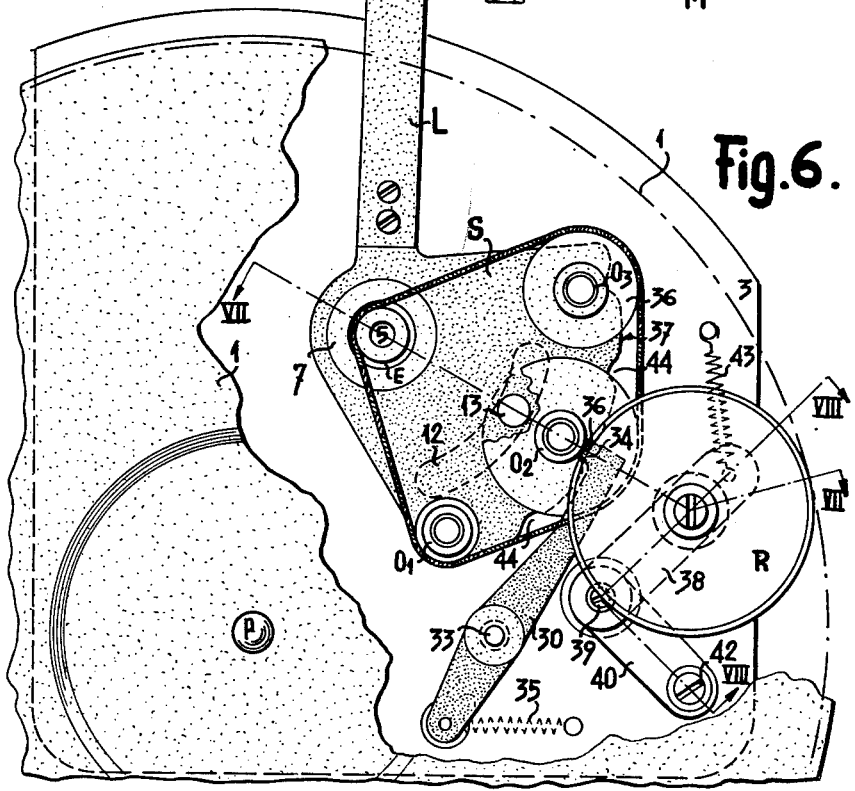
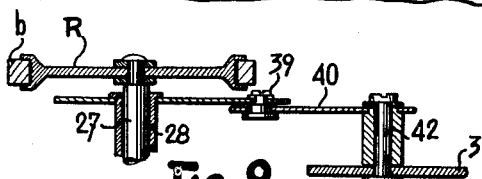
INVENTOR
Albert Jahncke.
BY
ATTORNEY

United States Patent Office 2,704,461
Patented Mar. 22, 1955

2,704,461
DRIVING DEVICE FOR A GRAMOPHONE TURN-TABLE

Albert Jahncke, Geneva, Switzerland, assignor to Hermann Thorens S. A., Sainte-Croix, Switzerland, a limited liability stock company of Switzerland Application August 25, 1950, Serial No. 181,440

Claims priority, application Switzerland September 5, 1949

16 Claims. (Cl. 74—200)

During the reproduction of a record of quality, the smallest changes in speed are readily sensitive to the ear and therefore distort the good quality of reproduction. It is for this reason that in the majority of apparatus actually on the market, the turn-table is driven by friction being connected to its driving motor by a wheel the periphery of which is provided with a coating of rubber or other material presenting a high friction coefficient. These driving devices comprising friction driving members are satisfactory, but only with difficulty allow of a connection having several transmission ratios of driving the turn-table at one of the three normal speeds (78 R. P. M., 45 R. P. M., 33⅓ R. P. M.).

The object of the present invention is a driving device for a turn-table comprising a change of gear provided with an intermediate wheel driving by friction the turn-table and itself driven by friction by one of several rotary members rotatably driven by a driving motor. The said device differs from known devices by the fact that at least two of the said rotary members are mounted on an angularly movable support, by means of an operating member, following an axis parallel to that of the turn-table, stop means being provided to define the angular positions of the said support for which one of the said rotary members is in contact with the said intermediate wheel, and by the fact that the said rotary members are interconnected by a single driving belt.

The accompanying drawing shows diagrammatically and by way of example two embodiments of the driving device of the invention.

Figs. 1 to 3 are plan views of the first embodiment of the device, certain parts being broken away or omitted for a clearer understanding of the drawing, the members and elements of the said device being shown in three different positions.

Fig. 4 is a sectional view along the line IV—IV of Fig. 1.

Fig. 5 is a sectional view along the line V—V of Fig. 1, the turn-table being omitted.

Fig. 6 is a plan view of the second embodiment of the device, certain parts being broken away for a clearer understanding of the drawing.

Fig. 7 is a sectional view along the line VII—VII of Fig. 6.

Fig. 8 is a sectional view along the line VIII—VIII of Fig. 6.

Fig. 9 is a larger scale view of a belt tension regulating device.

According to Figs. 1 to 5 of the accompanying drawing, the driving device of the turn-table 1 of a gramophone comprises a motor M secured to a motor frame part 2 integral with the base plate 3 of the machine by means of attachment members 4 which preferably include elastic elements (not shown). The shaft 5 of the said motor carries a rotary member $O_1$ or pulley connected by a belt C to two other rotary members or pulleys $O_2$ and $O_3$ mounted on a support S. The members $O_2$ and $O_3$ pivot freely on spindles or axes 6 rigidly secured to the support S displaceable angularly by means of an operating member L. To this end, the said support S pivots on a sleeve 7 coaxial with the shaft 5 and fastened to an intermediate member 8 secured to the base plate 3 by means of attachment members 9 and through the intermediary of elastic elements $f$. The shaft 5 is parallel to the axis of rotation $p$ of the turntable 1.

The said intermediate member 8 comprises an aperture 10 into which engages one end of the operating member L. To this end, the end 11 of the said member is offset by a value $e$ equal to the thickness of the intermediate member. Thus the said end 11 rests on the upper face of the said member 8 whereas the body of the operating lever L is in contact with the lower face of the latter. The member 8 is provided with a further aperture 12 in the shape of an arc of a circle, traversed by a finger 13 fastened to the support S and the end of which engages a longitudinal aperture 14 made in the operating member L. A felt washer 15 bearing on the one hand on the lower face of the lever L and on the other hand on an elastic ring 17 engaged in a groove of the finger 13, tends to maintain the body of the lever L in contact with the lower face of the intermediate support 8. The latter also comprises stop notches 18, 19 and 20 with which cooperate, under the action of a spring 22, a lug 21 fastened to the lever L. The second end of the operating lever L protrudes from the lower face of the support 8 and forms an operating handle or control-lever.

The rotary members or pulleys $O_1$, $O_2$, $O_3$ each comprise two co-axial parts 31 and 32. They are interconnected by a single belt C passing over their parts 31, the periphery of which is slightly curved. Their parts 32 may be brought alternatively into contact, by the operation of the operating lever L, with an intermediate wheel R, carried by a lever 24, hinged to the base plate 3. The said intermediate wheel is held in contact with the edge of the turn-table 1 and with one of the rotary members by means of a spring 23. The longitudinal displacements of the lever 24, necessary to this end, are rendered posssible by the fact that the axis 25 of the articulation of the said lever on the base plate 3 is engaged in an aperture 26 formed in the said lever.

The axis 27 of the intermediate wheel R turns in a bearing 28 rigidly secured to the lever 24. A clearance 29 (Fig. 5) formed in the base plate 3 permits the displacements of the bearing 28 relative thereto.

The operation of the device described above is the following:

When the operating lever L is placed in the position shown in Fig. 1, the part 32 of the rotary member $O_1$ is in contact with the periphery of the intermediate wheel R. The diameters of this part 32 and of the wheel R are calculated, relative to the speed of rotation of the shaft 5 and to the diameter of the tread $r$ of the wheel R on the turn-table, in such a way that the speed of rotation of the said table is 78 R. P. M., which corresponds to the speed of rotation necessary for the hearing of the majority of records.

Slippage between the wheel R and the pulley $O_1$ on the one hand and the pendant flange of the turn-table on the other hand, under the action of the normal torque to be transmitted, is rendered impossible by a rubber beading $b$ or other material having a high friction coefficient applied to the periphery of the wheel R.

By angularly displacing the member L to the position shown in Fig. 2 the user is able to bring the part 32 of the pulley $O_2$ into contact with the intermediate wheel R. This latter has been displaced by the said rotary member, against the action of the spring 23, so that the angle $a$ formed by the radii of the intermediate wheel passing its points of contact with the turn-table on the one hand, and with the pulley $O_2$ on the other hand, has approximately the same value as in the case of Fig. 1.

The diameters of the parts 31 and 32 of the pulley $O_2$ are chosen, relative to the diameter of the part 31 of the pulley $O_1$, in such a way that the turn-table is driven at the speed of 33⅓ R. P. M.

On the other hand, when the operating lever L is placed in the angular position shown in Fig. 3, the support of the rotary members or pulleys has turned through a sufficient angle around the sleeve 7 for the part 32 of the rotary member $O_3$ to be in contact with the periphery of the intermediate wheel R. The diameters of the parts 31 and 32 of the said rotary member $O_3$ are chosen relative to the diameter of the part 31 of the member $O_1$ so that the turn-table is driven at a speed of 45 R. P. M.

As shown in Fig. 3, the intermediate wheel has been displaced by pulley $O_3$, against the action of the spring 23 so that the angle $a$ formed by the radii of the wheel R passing the points of contact of the same with the turn-table on the one hand, and with the member $O_3$ on the other hand, has approximately the same value as for the positions of the member L shown in Figs. 1 and 2.

In the embodiment shown in Figs. 6 to 8, there are to be found the same members and elements as those described above with reference to Figs. 1 to 5 of the accompanying drawing or their equivalents.

The motor M is secured through elastic elements $f$ to the base plate 3 which carries a sleeve 7 co-axial with the shaft 5 and traversed by the latter. On the said sleeve pivots the support S which carries the operating member L rigidly secured thereto, and which is constituted by a simple handle or control-lever. The shaft 5 carries a driving member E rigidly secured at its end issuing above the support S. The said member E has a part 41 adapted to receive a belt C passing over the parts 31 of the three rotary members $O_1$, $O_2$, $O_3$ carried by the support S.

A latch formed by a lever 30, hinged at 33 to the base plate 3 and carrying a nose 34 co-operating, under the action of a spring 35, with notches 36 formed in the edge 37, in the shape of an arc of a circle centered on the shaft 5 of the support S, defines the three positions of the said support for which one of the three rotary members $O_1$, $O_2$, $O_3$ is in contact wtih the intermediate wheel R.

The latter is pivoted to one of the ends of a lever 38 hinged at 39 at its other end on a second lever 40 turning on an axis 42 carried by the base plate 3. A spring 43 acting on the lever 38 tends to maintain the wheel R in contact with the edge of the turn-table 1 on the one hand and with one of the rotary members $O_1$, $O_2$, $O_3$ on the other hand. The latter are situated at about equal distance from one another and are arranged on a circle centered approximately on the driving shaft 5.

As in the embodiment described with reference to Figs. 1 to 5, according to the angular positions occupied by the operating member L, the turn-table is driven through one or the other of the rotary members $O_1$, $O_2$, $O_3$. By the choice of the diameters of the parts 31 and 32 of the said rotary members, it is easy to obtain three desired speeds of rotation of the turn-table 1. Finally, notches 44 with which co-operate the nose 34 of the lever 30, define the positions for which the mechanical connection between the motor M and the turn-table is established.

The driving device described may also be provided with a regulating device for the tension of the belt C. An embodiment of the said device is shown diagrammatically in Fig. 9. The axis 6 of one of the rotary members carries a foot 45 out of center and engaged in a bore 46 of the support S. By pivoting the foot 45 in its bore, one causes displacements of the axis 6 parallel to itself. A blocking member 47 allows of fixing the position of the axis 6.

It is obvious that one or more of the axes 6 may be provided with such a regulating device.

From the foregoing description and drawings it will now be understood that the invention provides simple and effective means for selecting a change of speed for turntables. Moreover, the said invention requires little space so that it may easily be accommodated in the box of a gramophone.

It is obvious that many other embodiments may be conceived without departing from the spirit of the present invention. Indeed, any number of different driving speeds of the turn-table may be provided, since it is sufficient to provide the corresponding number of angular positions of the operating lever and the necessary number of rotary members such as $O_1$, $O_2$, $O_3$ having two co-axial parts 31 and 32, the one adapted to receive the belt C, the other adapted to drive the wheel R by friction.

In a modification of the embodiment shown in Figs. 6 to 8, the driving shaft 5 could be co-axial with one of the rotary members $O_1$, $O_2$, $O_3$. In such a case, the motor M would be suspended from the support S and the driving member E would be omitted. This modification is however less interesting from the constructive point of view than those described with reference to the drawing because the motor is displaced angularly with the support S thus necessitating the provision in the gramophone of a very large space free from any member in order to allow the said displacements of the motor M.

I claim:

1. A transmission mechanism for driving a phonograph turntable of the pendant flange type comprising a frame including a base plate, a motor plate, and an intermediate member, a motor mounted on the motor plate, a shaft for the motor, a pulley on the shaft, a support mounted on the intermediate member for pivotal motion about the motor pulley axis, a plurality of other pulleys journalled on the support, all pulleys having each a lower portion and an upper part, a belt connecting the lower pulley portions, an intermediate wheel movably mounted on the frame and urged to engage the upper portion of one of the pulleys according to the angular position of the support and to engage the flange of the turntable, the ratio between the diameters of the lower and upper portions of a pulley differing from the corresponding ratio of every other pulley, and manually operable means swinging the support to a selected position engaging an upper pulley portion with the intermediate wheel.

2. A transmission mechanism for driving a phonograph turn-table of the pendant flange type, comprising, a frame including a base plate pivotally supporting the turn-table, a motor plate suspended from the base-plate, an intermediate member disposed between the base plate and the motor plate, a motor mounted on the motor plate, a shaft for the motor, a pulley on the shaft, a support mounted on the intermediate member for pivotal motion about the motor pulley axis, a plurality of other pulleys journalled on the support, all pulleys having each a lower portion and an upper part, a belt connecting the lower pulley portions, journalling lever means fulcrumed on said base plate, spring means urging one end of the lever means to move toward the turn-table flange, turn-table drive wheel journalled on the lever means and engaging with the turn-table flange and the upper portion of one of the pulleys according to selected position of the pulley support, the ratio between the diameters of the lower and upper portions of a pulley differing from the corresponding ratio of every other pulley.

3. The mechanism according to claim 2 and wherein the journalling lever means comprises a lever fulcrumed on said base plate and lengthwise slidable on the fulcrum.

4. A transmission mechanism for driving a phonograph turn-table of the pendant flange type, comprising, a frame including a base plate pivotally supporting the turn-table, a motor plate suspended from the base plate, an intermediate member disposed between the base plate and the motor plate and elastically connected to said base plate, a motor mounted on the motor plate, a shaft for the motor, a pulley on the shaft, a support mounted on said intermediate member for pivotal motion about the motor pulley axis, a plurality of other pulleys journalled on the support, all pulleys having each a lower portion and an upper part, a belt connecting the lower pulley portions, an intermediate wheel movably mounted on the frame and urged to engage the upper portion of one of the pulleys according to the angular position of the support and to engage the flange of the turntable, the ratio between the diameters of the lower and upper por- of a pulley differing from the corresponding ratio of every other pulley, and manually operable means connected to the support for angular motion thereof and urged toward the intermediate member and holding the support in a selected angular position.

5. The mechanism according to claim 4 and wherein the last mentioned means comprises an operating lever fulcrumed on said intermediate member and lengthwise slidable on its fulcrum and a spring urging the lever toward and inwardly of said intermediate member and notches in said intermediate member each receiving a lever part in a selected position thereof.

6. The mechanism according to claim 5 and wherein the last mentioned means of claim 4 also comprise a finger fixed to the support and movable in an arcuate slot in the intermediate member and in a lengthwise slot in the operating lever.

7. The mechanism according to claim 1 and wherein one of the pulley journals is eccentrically and angularly adjustably mounted on the support to provide a belt tightener.

8. The mechanism according to claim 2 and wherein the lever means comprise a pair of levers each pivoted at one end to the other and including one lever fulcrumed at the other end to the base plate and another lever at its other end urged toward the turntable flange.

9. The mechanism according to claim 1 and wherein the manually operable means swinging the support includes a handle rigid therewith, and also comprising means mounted on said intermediate member and latching the support in selected positions.

10. The mechanism according to claim 9 and wherein the latching means comprise a lever fulcrumed on the intermediate member and urged toward the said intermediate member which carries notches engageable with the lever.

11. A driving mechanism for a gramophone turn-table comprising a driving motor, a change speed means provided with an intermediate wheel driving by friction the said turn-table and at least two rotary members rotatably driven by said driving motor, said intermediate wheel being driven by friction by one of said rotary members, said driving mechanism comprising a support angularly displaceable on an axis parallel to that of said turn-table, said rotary members being mounted on said support and arranged approximately on an arc whose axis coincides with the axis of driving shaft of said motor, an operating member to displace angularly said support, stop means defining the angular positions of said support for which one of said rotary members is in contact with said intermediate wheel, a single driving belt connecting said rotary members to said driving shaft, and a belt tension device.

12. A driving mechanism as claimed in claim 11, in which said rotary members comprise each two parts of different diameter, one part being adapted to receive said driving belt, the other adapted for frictionally driving said intermediate wheel, a spindle fastened to said support for each of said rotary members, and in which said belt tension device comprises an eccentric foot carried by at least one of said spindles, a bore in said support adapted to receive said eccentric foot and a blocking device allowing of fixing the angular position of said foot in said bore.

13. A driving mechanism for a gramophone turntable comprising a driving motor, a speed change means provided with an intermediate wheel frictionally driving said turntable, three rotary members rotatably driven by said driving motor, said intermediate member being driven by one of said rotary members, said driving mechanism also comprising a rotary member support angularly displaceable about an axis parallel to that of said turntable, an operating member, two of said rotary members being mounted on said support, stop means each defining an angular position of said support in which one of said rotary members is in contact with said intermediate wheel, a third rotary member mounted on the shaft of the driving motor, said three rotary members each having its axis on one of the corners of a triangle, and a single belt trained over the three rotary members and held by its elasticity in frictional contact with a portion of the periphery of each rotary member.

14. The driving mechanism according to claim 13 and wherein each rotary member comprises two parts, one driven by the belt and the other one for frictionally driving said intermediate wheel whereby the ratios between the diameters of the two parts of each rotary member determine the three driving speeds of the turntable.

15. In a driving mechanism for a gramophone turntable comprising a driving motor, a speed change means including an intermediate wheel frictionally driving said turntable, a plurality of rotary members rotatably driven by said driving motor, said intermediate wheel being driven by friction by one of said rotary members, said driving mechanism comprising a support angularly displaceable about an axis parallel to that of said turntable, an operating member, said rotary members being mounted on said support, stop means each defining an angular position of said support in which one of said rotary members is in contact with said intermediate wheel, a driving member fastened to the shaft of said motor, and a driving belt connecting said rotary member with said driving member, each of the axes of the rotary members being located at the corner of a polygon.

16. A driving mechanism according to claim 15 and wherein each rotary member comprises two parts, one receiving the driving belt and the other one for frictionally driving said intermediate wheel whereby the ratios between the two parts of each rotary member determine the several driving speeds of said turntable.

References Cited in the file of this patent

UNITED STATES PATENTS

| | | |
|---|---|---|
| 1,591,494 | Lanchester | July 6, 1926 |
| 2,518,769 | Gay | Aug. 15, 1950 |
| 2,612,053 | Capell | Sept. 30, 1952 |
| 2,660,896 | Hartman | Dec. 1, 1953 |

FOREIGN PATENTS

| | | |
|---|---|---|
| 554,369 | France | Feb. 8, 1923 |
| 431,098 | Italy | Feb. 23, 1948 |